No. 748,127. PATENTED DEC. 29, 1903.
F. M. WILLIAMS.
LIFTING JACK.
APPLICATION FILED MAR. 14, 1903.
NO MODEL.
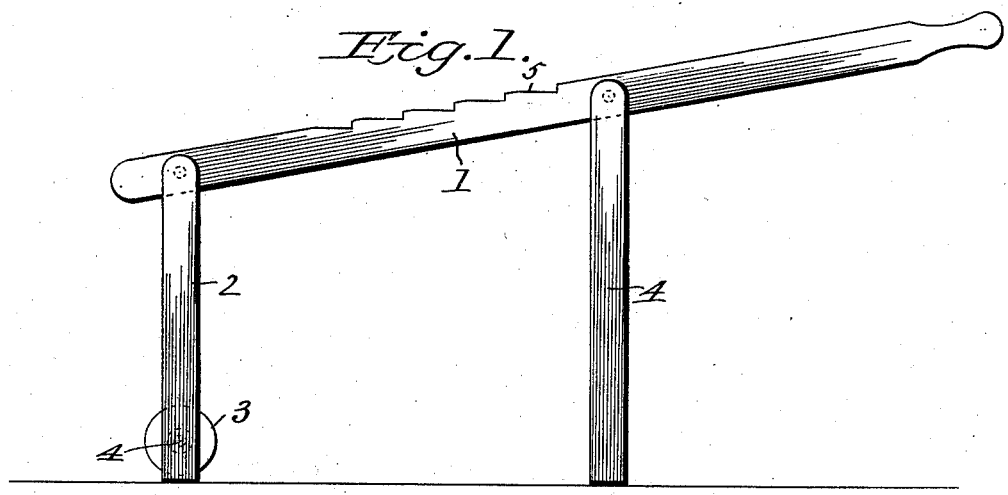
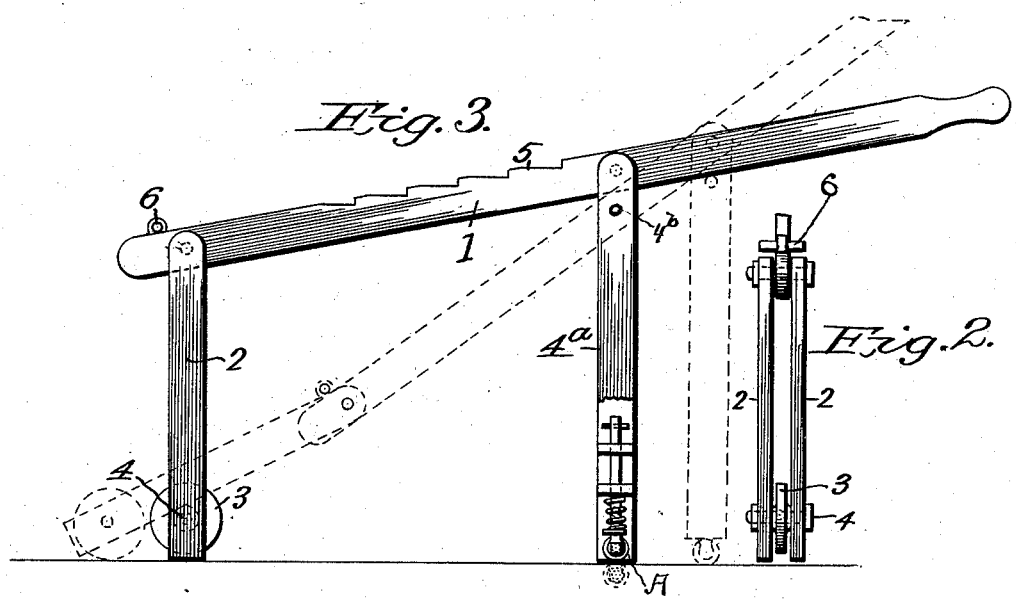

No. 748,127. Patented December 29, 1903.

UNITED STATES PATENT OFFICE.

FRANCIS M. WILLIAMS, OF IOWA FALLS, IOWA.

LIFTING-JACK.

SPECIFICATION forming part of Letters Patent No. 748,127, dated December 29, 1903.

Application filed March 14, 1903. Serial No. 147,796. (No model.)

*To all whom it may concern:*

Be it known that I, FRANCIS M. WILLIAMS, a citizen of the United States of America, residing at Iowa Falls, in the county of Hardin and State of Iowa, have invented certain new and useful Improvements in Lifting-Jacks, of which the following is a specification.

This invention relates to hoisting machinery, and particularly to that class known as "lifting-jacks."

The object of the invention is to produce a lifting-jack having novel means for permitting its being moved or conveyed; furthermore, to produce a lifting-jack having a wheel whereby one supporting member of the jack is caused to ride into position, and, furthermore, to provide means for utilizing the wheel in transporting the jack.

Finally the object of the invention is to produce a jack which will possess advantages in points of utility, simplicity, strength, and durability, proving at the same time comparatively inexpensive.

With the foregoing and other objects in view the invention consists in the details of construction and in the arrangement and combination of parts to be hereinafter more fully set forth and claimed.

In describing the invention in detail reference will be had to the accompanying drawings, forming part of this specification, wherein like characters denote corresponding parts in the several views, and in which—

Figure 1 is a view in elevation illustrating a lifting-jack embodying the invention. Fig. 2 is a detail view. Fig. 3 illustrates a slightly-modified construction.

In the drawings, 1 indicates a notched bar or lever for the support of the axle of vehicles. A standard comprising strips 2 is pivoted near the end of the bar 1, and a wheel 3 is mounted between the strips on a bolt 4, which passes through the strips. The wheel is provided to support the standard when it is in an inclined or an approximately horizontal position. The standard 4 is about the same in construction as the one heretofore described and is pivoted to the bar in front of the notch 5.

In operation the bar is placed under an axle with the standard 4 vertically disposed. The bar is then manipulated to bring the notched portion into engagement with the axle and by further pressure elevates the axle until the standard 2 is approximately vertically disposed, when the jack will support the axle with its wheel clear of the floor or ground.

In the modification shown in Fig. 3 the wheel A is provided for the front standard 4ª, and it is spring-held in the position shown in dotted lines. When supporting a vehicle-axle, the weight is sufficient to cause the wheel to pass between the sides of the standard and permit the end of the standard to engage the ground or floor. The wheel A will be found useful in moving the jack or in adjusting the standard for use.

I may have the end of the bar extend beyond the end of the standard and provide a stop-pin 6 on the bar to abut the standard, thus preventing the downward movement of the standard and bar beyond a predetermined distance when moving the device upon the wheels 3 and A. The arrangement allows for the guiding of the jack when it is being wheeled from place to place. A stop-pin 4ᵇ is also provided in the front standard in order to retain the said standard in an approximately vertical position when moving the device.

The construction, operation, and advantages will, it is thought, be understood from the foregoing description, it being noted that various changes may be made in the proportions and details of construction for successfully carrying the invention into practice.

Having fully described my invention, what I claim as new, and desire to obtain by Letters Patent, is—

1. In a lifting-jack, a notched lever, a standard or support near one end of the lever, a second standard pivoted to the lever, a stop on the last-named standard for engaging the lever, a pin carried by the lever for engaging the other standard and wheels in the lower ends of the standards.

2. In a lifting-jack, a notched lever, a standard or support near one end of the lever, a second standard pivoted to the lever, a wheel in the first-named standard and a pin for limiting the swing of the last-named standard with relation to the lever.

In testimony whereof I affix my signature, in the presence of two witnesses, this 7th day of March, 1903.

FRANCIS M. WILLIAMS.

Witnesses:
 FRANK D. PEET,
 C. B. RICHMOND.